(12) United States Patent
Park

(10) Patent No.: US 11,720,436 B1
(45) Date of Patent: Aug. 8, 2023

(54) SYSTEM FOR ERROR DETECTION AND CORRECTION IN A MULTI-THREAD PROCESSOR

(71) Applicant: Ceremorphic, Inc., San Jose, CA (US)

(72) Inventor: Heonchul Park, Pleasanton, CA (US)

(73) Assignee: CEREMORPHIC, INC., San Jose, CA (US)

( * ) Notice: Subject to any disclaimer, the term of this patent is extended or adjusted under 35 U.S.C. 154(b) by 0 days.

(21) Appl. No.: 17/536,195

(22) Filed: Nov. 29, 2021

(51) Int. Cl.
*G06F 11/00* (2006.01)
*G06F 11/07* (2006.01)

(52) U.S. Cl.
CPC ........ *G06F 11/079* (2013.01); *G06F 11/0724* (2013.01); *G06F 11/0751* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 10,042,687 B2 * | 8/2018 | Lowell | G06F 9/30021 |
| 2002/0133745 A1 * | 9/2002 | Okin | G06F 11/1497 |
| | | | 714/E11.143 |
| 2006/0150186 A1 * | 7/2006 | Grayver | G06F 11/1494 |
| | | | 714/E11.008 |
| 2017/0351577 A1 * | 12/2017 | Scobie | G06F 11/1641 |
| 2018/0276102 A1 * | 9/2018 | Chandra | G06F 11/3636 |
| 2019/0073225 A1 * | 3/2019 | Mace | G06F 9/3851 |

OTHER PUBLICATIONS

Google Scholar Patents/Scholar search—text refined (Year: 2022).*
Google Scholar/Patents search—text refined (Year: 2023).*

* cited by examiner

*Primary Examiner* — Christopher S McCarthy
(74) *Attorney, Agent, or Firm* — Minisandram Law Firm; Raghunath S. Minisandram

(57) ABSTRACT

A system for detecting errors and correcting errors in a multi-thread processor is disclosed. The multi-thread processor includes a first processor and a second processor. First processor executes a first thread and a second thread. Second processor executes a third thread and fourth thread. An instruction execution is initiated in all four threads. Output of the instruction execution from all four threads are compared for a match by a data compare engine to detect an error in execution of the instruction. When output of the instruction execution from one of the four threads does not match, an error in execution is detected and the output is replaced by one of the other three threads whose output does match. When output of the instruction execution by two or more threads does not match, error is detected, but not corrected.

9 Claims, 5 Drawing Sheets

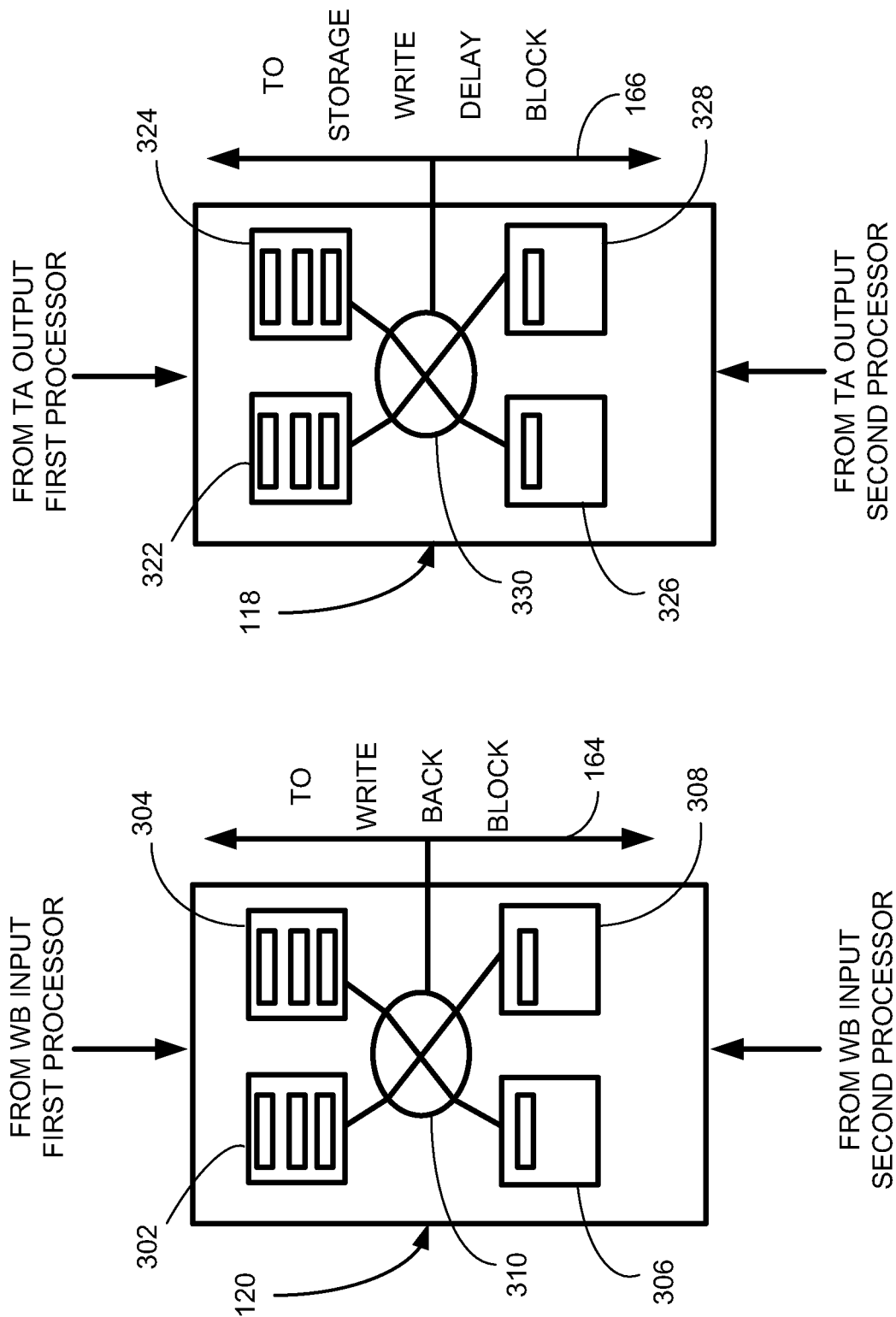

SYSTEM FOR ERROR DETECTION AND CORRECTION IN A MULTI-THREAD PROCESSOR

RELATED APPLICATION

None

TECHNICAL FIELD

The present invention relates generally to a multi-thread processor and more specifically, to detect error in processing of instructions and correct error in processing of instructions.

DESCRIPTION OF RELATED ART

Microprocessors and systems based on VLSI can have a fault during operation. These faults can lead to catastrophic disaster in certain applications, for example, in automotive applications or space applications, due to malfunction. These faults can happen for various known or unknown reasons. Generally, faults can be classified as transient faults and permanent faults.

The transient fault is a temporal fault and circuit produces an unexpected value, which leads to a temporal malfunction. On the other hand, a permanent fault results when a circuit is broken and cannot be recovered. When a transient fault can be detected, the program is restarted from a known clean point, with an acceptable delay. Thereafter, the system will continue to perform at an acceptable level. On the other hand, when a permanent fault is detected, in some circumstances, the faulty section of the circuit may be avoided, if possible. Otherwise, the permanent fault may results in a total system failure.

As microprocessors are used in critical applications requiring reliable operation of the circuits, it may be beneficial to detect any potential errors in processing in a timely manner, correct any detected problems in a timely manner and restart the processing with minimal time delay. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a multi-thread processor is disclosed. The multi-thread processor includes a first processor and a second processor. The first processor is configured to execute at least a first thread and a second thread. The second processor is configured to execute at least a third thread and a fourth thread. An instruction execution is initiated in the first thread of the first processor, at a first cycle, the execution of the instruction results in a first data to be written to a first storage location. Same instruction is executed in the second thread of the first processor at a second cycle, the execution of the instruction results in a second data to be written to a second location. Same instruction is executed in the third thread of the second processor at a third cycle, the execution of the instruction results in a third data to be written to a third location. Same instruction is executed in the fourth thread of the second processor at a fourth cycle, the execution of the instruction results in a fourth data to be written to a fourth location. At least one data compare engine is configured to selectively compare the first data, the second data, the third data, and the fourth data to detect an error in execution of the instruction by one or more of the first thread, the second thread, the third thread, and the fourth thread.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 2A shows an example table showing execution of various instructions through selective stages of a first processor of the multi-thread processor, according to one aspect of the present disclosure;

FIG. 2B shows an example table showing execution of various instructions through selective stages of a second processor of the multi-thread processor, according to one aspect of the present disclosure;

FIG. 3A shows an example second data compare engine of the multi-thread processor, according to one aspect of the present disclosure;

FIG. 3B shows an example first data compare engine of the multi-thread processor, according to one aspect of the present disclosure;

DETAILED DESCRIPTION

To facilitate an understanding of the adaptive aspects of the present disclosure, an example multi-thread processor will be described. The specific construction and operation of the adaptive aspects of various elements of the example error detection and correction will be further described with reference to the multi-core processor.

Figure 1:
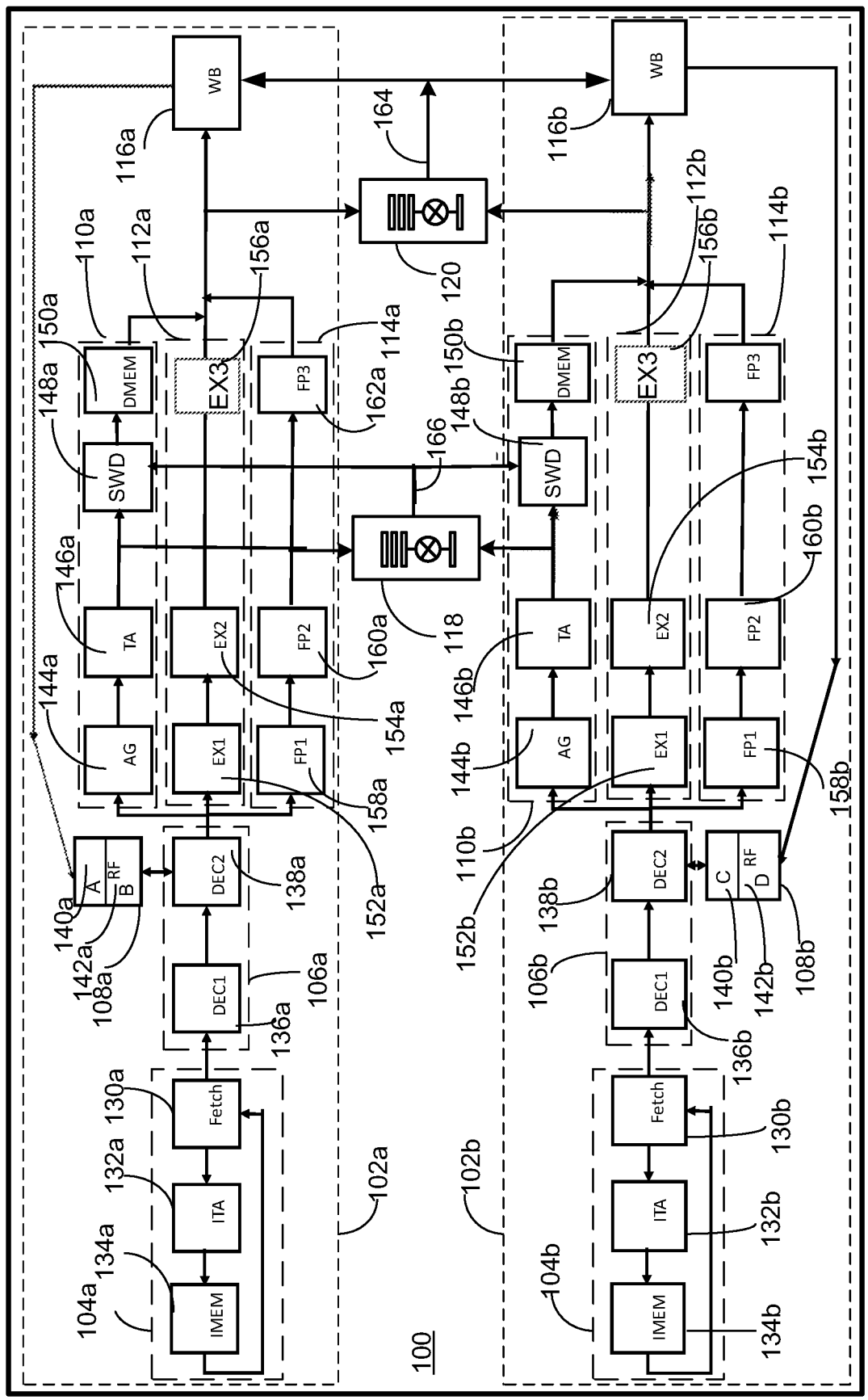
FIG. 1 shows an example multi-thread processor, according to one aspect of the present disclosure.

FIG. 1 shows an example multi-thread processor 100. The multi-thread processor 100 includes a first processor 102a and a second processor 102b. In one example, the first processor 102a and the second processor 102b are substantially similar. Each of the first processor 102a and the second processor 102b are configured to process multiple threads, in a pipelined fashion. In one example, each of the first processor 102a and the second processor 102b are configured to process two threads. Now details of the first processor 102a will be described. As one skilled in the art appreciates, the second processor 102b may be substantially similar.

The first processor 102a includes a fetch block 104a, a decode block 106a, a register file block 108a (sometimes referred to as RF 108a), a load-store pipe 110a (sometimes referred to as LS pipe 110a), an ALU pipe 112a, a FP pipe 114*a*, and a write back block 116*a* (sometimes referred to as WB 116*a*). The second processor 102*b* includes a fetch block 104*b*, a decode block 106*b*, a register file block 108*b* (sometimes referred to as RF 108*b*), a load-store pipe 110*b* (sometimes referred to as LS pipe 110*b*), an ALU pipe 112*b*, a FP pipe 114*b*, and a write back block 116*b* (sometimes referred to as WB 116*b*). The multi-thread processor 100 further includes a first data compare engine 118 (sometimes referred to as FDCE 118) and a second data compare engine 120 (sometimes referred to as SDCE 120). Functions and features of the first data compare engine 118 and the second data compare engine 120 will be later described in detail.

Now, referring to first processor 102*a*, the fetch block 104*a* includes a fetch instruction (Fetch) block 130*a*, an instruction address translator (ITA) block 132*a*, an instruction memory (IMEM) block 134*a*. The fetch instruction block 130*a* reads instructions in instruction memory block 134 using the instruction address translator block 132*a*. The decode block 106*a* decodes the instructions received from the fetch block 104*a*. For example, the decode block 106*a* parses operand register sources, types of operations to be performed and destination where the results are stored. In one example, the decode block 106*a* includes a first decoder (DEC1) 136*a* and a second decoder (DEC2) 138*a*. The first decoder 136*a* decodes the received instruction and decides which one of the execution pipe, for example, load-store pipe 110*a*, ALU pipe 112*a* and FP pipe 114*a* will be used. The second decoder 138*a* obtains necessary operands for the received instruction, for example, from the register file block 108*a*. If the corresponding execution pipe resources are not available or operand resources are not available from the register file block 108*a*, the execution of the instruction has to wait until necessary resources are available.

In one example, for first processor 102*a*, the register file block 108*a* may include separate register files for each thread. For example, in a two thread per processor scenario, (thread A, and thread B for first processor 102*a* and thread C and thread D for second processor 102*b*), the register file block 108*a* may include a thread A register file 140*a* and a thread B register file 142*a*. Similarly, the register file block 108*b* for second processor 102*b* may include a thread C register file 140*b* and a thread D register file 142*b*.

Now, referring to the load-store pipe of first processor 102*a*, the load-store pipe 110*a* includes an address generator (AG) 144*a*, an address translator (TA) 146*a*, and a data memory access (DMEM) block 150*a*. In some examples, the load-store pipe 110*a* may include a storage write delay (SWD) block 148*a*. The address generator 144*a* generates the address to be used by the instruction. The generated address by the address generator 144*a* is a virtual address. The address translator 146*a* receives the virtual address from the address generator 144*a* and converts the virtual address to a physical address. The converted physical address is used by the data memory access block 150*a* to either load from the physical address or store at the physical address, as the case may be. If the data is to be stored in a register file, for example, in the register file block 108*a*, the data is stored by the write back block 116*a*. If the data is to be stored in a data cache (not shown) assigned to the first processor 102*a*, the data is stored by the write back block 116*a*. If the data is to be stored in a memory location assigned to the first processor 102*a*, the data memory access block 150*a* stores the data in the memory location (not shown) assigned to the first processor 102*a*. The memory location (not shown) may be either internal or external to the multi-thread processor 100. The functions and features of the storage write delay block 148*a* will be later described in detail.

Now, referring to the ALU pipe of first processor 102*a*, the ALU pipe 112*a* includes a first execution (EX1) block 152*a*, a second execution (EX2) block 154*a* and a third execution (EX3) block 156*a*. Arithmetic and logical operations are selectively performed by the first execution block 152*a*, the second execution block 154*a*, and the third execution block 156*a*. The results are passed on to the write back block 116*a*, to selectively store the result in one of the register locations in the register file block 108*a*.

Now, referring to the FP pipe of first processor 102*a*, the FP pipe 114*a* is configured to perform floating point arithmetic. Due to complexity of operation, the floating point operations take three cycles, performed in first FP (FP1) block 158*a*, second FP (FP2) block 160*a*, and third FP (FP3) block 162*a*. In some examples, the results of FP pipe 114*a* is stored in a separate FP register file (not shown). The FP register file data can be stored or loaded from memory or cache using the load-store pipe 110*a*.

In one example, the first processor 102*a* is a dual issue processor. This means two instructions can be issued and processed. These instructions can be a combination of a) one load-store instruction and one ALU instruction, b) one ALU instruction and one floating point instruction, and c) one load-store instruction and one floating point instruction. As both the load-store pipe and ALU pipe both use the same register file, they complete in order. So, the third execution block 156*a* in ALU pipe 112*a* aids in this process.

Having described various components of the first processor 102*a*, in one example, the structure, function and operation of various components of the second processor 102*b* is similar to various components of the first processor 102*a*. For example, the fetch block 104*b* is similar to fetch block 104*a*. The decode block 106*b* is similar to decode block 106*a*. The resister file block 108*b* is similar to resistor file block 108*a*. The load-store pipe 110*b* is similar to load-store pipe 110*a*. The ALU pipe 112*b* is similar to ALU pipe 112*a*. The FP pipe 114*b* is similar to FP pipe 114*a*. The write back block 116*b* is similar to write back block 116*a*.

The first data compare engine 118 and the second data compare engine 120 are common to both the first processor 102*a* and the second processor 102*b*. The first data compare engine 118 is configured to receive output from the load-store pipe 110*a* of the first processor 102*a* and the load-store pipe 110*b* of the second processor 102*b*, for comparison. In one example, the output of the load-store pipe 110*a* prior to processing by the data memory access block 150*a* is fed to the first data compare engine 118.

Similarly, the output of the load-store pipe 110*b* prior to processing by the data memory access block 150*b* is fed to the first data compare engine 118. In one example, this output corresponds to a store operation, where the output is stored in a memory location other than the register file block, for example, an external memory. In one example, prior to feeding the output of the load-store pipe 110*a*, the output is selectively fed to the store write delay block 148*a*, which is thereafter, selectively fed to the data memory access block 150*a*, in first processor 102*a*. In one example, prior to feeding the output of the load-store pipe 110*b*, the output is selectively fed to the store write delay block 148*b*, which is thereafter, selectively fed to the data memory access block 150*b*, in second processor 102*b*. Functions and features of the store write delay block 148*a* and store write delay block 148*b* will be later described in detail.

The second data compare engine 120 is configured to receive input to the write back block 116*a* of the first processor 102*a* (in other words, output from the load-store pipe 110*a*, ALU pipe 112*a* or FP pipe 114*a* of the first processor 102*a*) and input to the write back block 116*b* of the second processor (in other words, output from the load-store pipe 110*b*, ALU pipe 112*b* or FP pipe 114*b* of the second processor 102*b*), for comparison. In one example, the output of the load-store pipe 110*a* after processing by the data memory access block 150*a* is fed to the second data compare engine 120. In one example, this output corresponds to a store operation executed by the first processor 102*a*, where the output is stored in the register file block 108*a*.

Similarly, the output of the load-store pipe 110*b* after processing by the data memory access block 150*b* is fed to the second data compare engine 120. In one example, this output corresponds to a store operation executed by the second processor 102*b*, where the output is stored in the register file block 108*b*.

In one example, the multi-thread processor 100 is configured to run four threads simultaneously, for example, two threads, thread A and thread B in the first processor 102*a* and two threads, thread C and thread D in the second processor 102*b*. Each thread, for example, thread A, thread B, thread C, and thread D have separate register files assigned to them. In some examples, each thread may share logics such as AND, NAND, OR, and MUXes. Thus, each thread is multiplexed among the running threads. If there is a single thread, then that thread is using maximum available capacity. On the other hand, if all four threads are running in parallel, then, each thread is using ¼th of the available capacity. As an example, if there are two threads are running in each processor, and the maximum clock speed is 1 GHz, then each processor is running at 1 GHz and each thread is running at 500 MHz.

In some examples, the multi-thread processor 100 may be referred to as a dual core lock step processor. In some examples, the multi-thread processor 100 may be referred to as a multi-thread, in-order issue, in-order completion processor. In-order issue means that instructions are sent to execution pipe as per program sequence. In-order completion means that instructions are completed as per program sequence. Having generally described the functions and features of the multi-thread processor 100, an example of detecting faults in the processing by the multi-thread processor 100 will be described. Further, an example of correcting detected faults in processing by the multi-thread processor 100 will also be described.

In one example, same instruction is executed by thread A, and thread B of the first processor 102*a* and thread C, and thread D of the second processor 102*b*. Depending upon the type of instruction executed, selective output from the load-store pipe of first processor 102*a* and the second processor 103*b* are compared for a match. Depending upon the result of the match, an error is detected. Further, depending upon the match, in some examples, the error is corrected. The error detection and error correction features of the multi-thread processor 100 will be further described with reference to FIG. 2A and FIG. 2B.

Figures 2A, 2B:
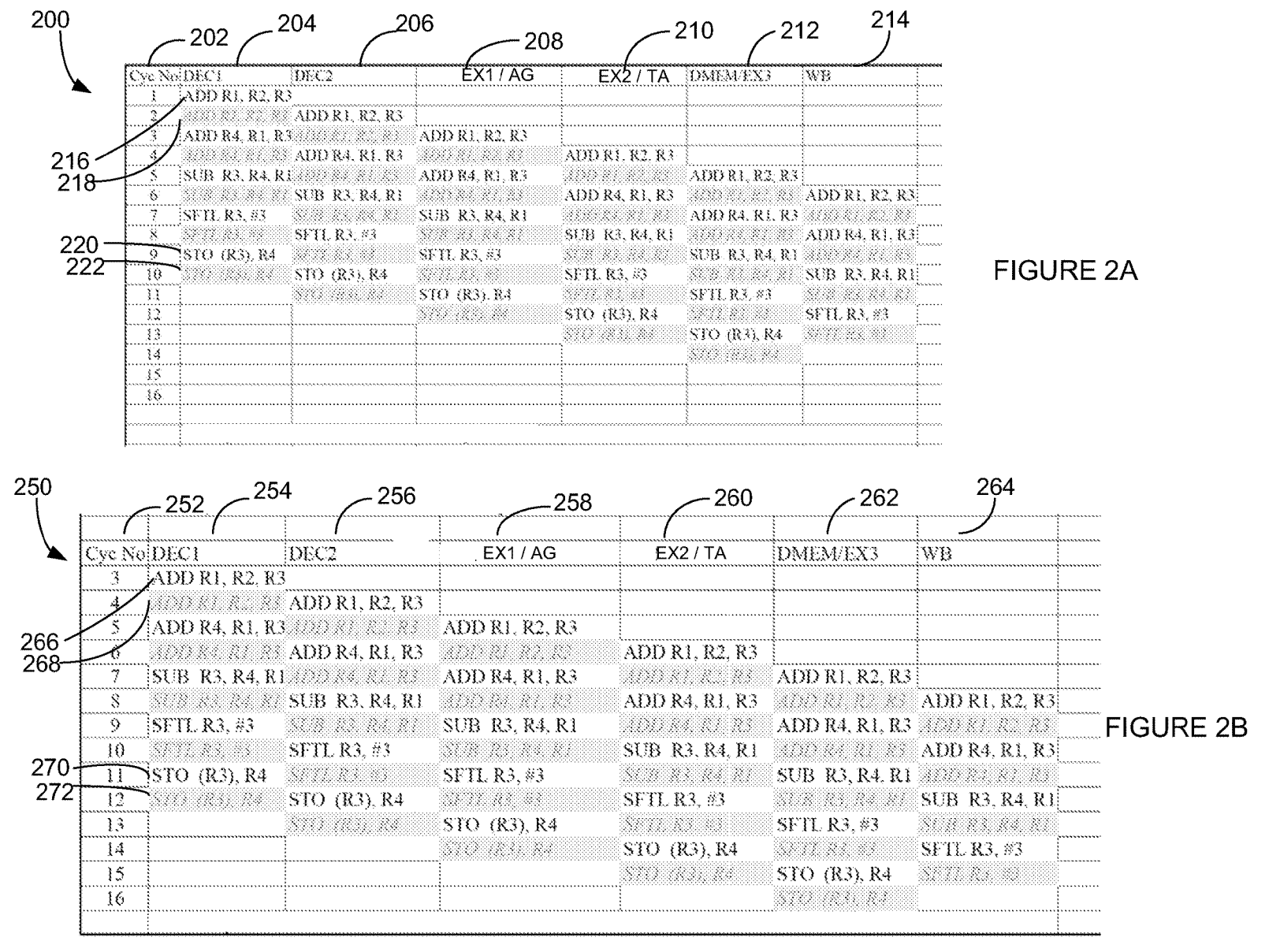

Now, referring to FIG. 2A, an example table 200 is shown. Table 200 shows execution of various instructions through selective stages of the first processor 102*a*, at various cycle times. Similarly, referring to FIG. 2B, another example table 250 is shown. Table 250 shows execution of various instructions through selective stages of the second processor 102*b*, at various cycle times. A first instruction ADD R1, R2, R3, a second instruction ADD R4, R1, R3, a third instruction SUB R3, R4, R1, a fourth instruction SFTL R3, #3, and a fifth instruction STO (R3), R4 are executed in sequence, in both thread A, and thread B of the first processor 102*a* and thread C, and thread D of the second processor 102*b*.

Now, referring back to FIG. 2A, table 200, column 202 shows cycle number and columns 204-214 show corresponding instruction completed at various stages of the first processor 102*a*. For example, column 204 shows output at first decoder 136*a*, column 206 shows output at second decoder 138*a*. Columns 208, 210, 212 correspond to selective pipelined stages of the corresponding pipe based on the type of instruction being executed. For example, for load-store pipe 110*a*, column 208 corresponds to the output at address generator 144*a*, column 210 corresponds to the output at address translator 146*a*, and column 212 corresponds to the output at data memory access block 150*a*. Similarly, for ALU pipe 112*a*, column 208 shows output at first execution block 152*a*, column 210 shows output at second execution block 154*a*, column 212 shows output at third execution block 156*a*. Column 214 shows output at write back buffer block 116*a*.

For example, referring to cell 216, at the end of cycle 1, first instruction ADD R1, R2, R3 was processed by first decoder 136*a*, as part of execution of thread A. Similarly, referring to cell 218, at the end of cycle 2, first instruction ADD R1, R2, R3 was processed by first decoder 136*a*, as part of execution of thread B. For ease of understanding, instructions corresponding to thread B has been italicized and correspond cells have been highlighted.

Now, referring back to FIG. 2B, table 250, column 252 shows cycle number and columns 254-264 show corresponding instruction completed at various stages of the second processor 102*b*. For example, column 254 shows output at first decoder 136*b*, column 256 shows output at second decoder 138*b*. Columns 258, 260, 262 correspond to selective pipelined stages of the corresponding pipe based on the type of instruction being executed. For example, for load-store pipe 110*b*, column 258 corresponds to the output at address generator 144*b*, column 260 corresponds to the output at address translator 146*b*, and column 262 corresponds to the output at data memory access block 150*b*. Similarly, for ALU pipe 112*b*, column 258 shows output at first execution block 152*b*, column 260 shows output at second execution block 154*b*, column 262 shows output at third execution block 156*c*. Column 264 shows output at write back buffer block 116*b*.

For example, referring to cell 266, at the end of cycle 3, first instruction ADD R1, R2, R3 was processed by first decoder 136*b*, as part of execution of thread C. Similarly, referring to cell 268, at the end of cycle 4, first instruction ADD R1, R2, R3 was processed by first decoder 136*b*, as part of execution of thread D. For ease of understanding, instructions corresponding to thread D has been italicized and correspond cells have been highlighted.

Having described construction of table 200 of FIG. 2A and table 250 of FIG. 2B, example error detection and error correction of the operation of the multi-thread processor 100 will now be explained.

Referring to FIG. 2A and table 200, the processing of first instruction ADD R1, R2, R3 by thread A will proceed through cycle Nos. 1, 2, 3, 4, 5, and 6. As one skilled in the art appreciates, the first instruction ADD R1, R2, R3 means add contents of registers R2 and R3 and store the resulting sum in register R1. As previously mentioned, the register file block 108*a* includes a separate register file 140*a* for thread A and a separate register file 142*a* for thread B. So, under normal operating conditions, the resulting sum is available after cycle No. 5, at the output of third execution block 156*a* and resulting sum will be available at the output of the write back block 116a in cycle No. 6, which will conclude writing into register file 140a.

Similarly, the processing of first instruction ADD R1, R2, R3 by thread B will proceed through cycle Nos. 2, 3, 4, 5, 6, and 7. So, under normal operating conditions, the resulting sum is available after cycle 6, at the output of third execution block 156a and resulting sum will be available at the output of the write back block 116a in cycle No. 7, which will be written into register file 142a, which corresponds to assigned register file for thread B.

Referring to FIG. 2B and table 250, the processing of first instruction ADD R1, R2, R3 by thread C will proceed through cycle Nos. 3, 4, 5, 6, 7, and 8. As previously mentioned, the register file block 108b includes a separate register file 140b for thread C and a separate register file 142b for thread D. So, under normal operating conditions, the resulting sum is available after cycle No. 7, at the output of third execution block 156b and resulting sum will be available at the output of the write back block 116b in cycle No. 8, and written into register file 140a.

Similarly, the processing of first instruction ADD R1, R2, R3 by thread D will proceed through cycle Nos. 4, 5, 6, 7, 8, and 9. So, under normal operating conditions, the resulting sum is available after cycle 8, at the output of third execution block 156b and resulting sum will be available at the output of the write back block 116b in cycle No. 9, and written into register file 142b, which corresponds to assigned register file for thread D.

In summary, we see that the output of first instruction ADD R1, R2, R3 processed by first processor 102a is available at the end of cycle No. 5 for thread A, end of cycle No. 6 for thread B. Similarly, we see that the output of first instruction ADD R1, R2, R3 processed by second processor 102b is available at the end of cycle No. 7 for thread C, and end of cycle No. 8 for thread D.

In one example, the output of thread A at the end of cycle No. 5, thread B at the end of cycle No. 6, thread C at the end of cycle No. 7 and thread D at the end of cycle No. 8 are selectively compared for a match. For example, the second data compare engine 120 may be selectively configured to perform the comparison of the output of thread A, thread B, thread C, and thread D. FIG. 3A shows an example second data compare engine 120.

Now, referring to FIG. 3A, second data compare engine 120 is described. The second data compare engine is configured to receive the input to the write back block 116a of the first processor 102a (in other words, output from the load-store pipe 110a, ALU pipe 112a or FP pipe 114a of the first processor 102a) and input to the write back block 116b of the second processor (in other words, output from the load-store pipe 110b, ALU pipe 112b or FP pipe 114b of the second processor 102b), for comparison. As previously described, the thread A, thread B, thread C and thread D are initiated at different cycles, and in this example, in consecutive cycles, the second data compare engine 120 includes a plurality of buffers to hold the output of each thread A, thread B, thread C, and thread D, until all the outputs are available for comparison. In one example, a plurality of buffers are provided for each thread, to store output at various cycles. For example, the second data compare engine 120 may include a thread A buffer bank 302, a thread B buffer bank 304, thread C buffer bank 306, and thread D buffer bank 308. The second data compare engine 120 further includes a comparator 310, configured to selectively compare the output of thread A, thread B, thread C and thread C. In one example, selective output of thread A buffer bank 302 is compared with selective output of thread C buffer bank 306, for a match by the first comparator 310. Further, selective output of thread B buffer bank 304 is compared with selective output of thread D buffer bank 308, for a match by the first comparator 310.

In one example, for first instruction ADD R1, R2, R3, the output of thread A at cycle 5 stored in the thread A buffer bank 302 is selectively compared with the output of thread C at cycle 7 stored in the thread C buffer bank 306 for a match. Similarly, the output of thread B at cycle 6 stored in the thread B buffer bank 304 is selectively compared with the out of thread D at cycle 8 stored in the thread D buffer bank 308 for a match.

In one example, if selective outputs from all of the four threads A, B, C, and D match, then it is concluded that there is no error in processing by the multi-core processor 100. If selective outputs from three out of the four threads A, B, C, and D are a match, then it is concluded that there is an error in processing by the multi-core processor 100. Further, the selective output of the thread that does not match with other three threads is considered as at fault and replaced by one of the outputs of the other three threads. For example, if selective outputs of thread A, thread B, and thread C are same and the selective output of thread D is different, then, it is concluded that there was an error in processing thread D. Further the value of the output of thread D is replaced by one of the values of the output of thread A, thread B, or thread C. In one example, the second compare engine 120 will generate a mismatch signal 164 to the write back block 116b (which corresponds to thread D) to selectively replace the value of the output of thread D.

In one example, after the write back block 116b has replaced the value of the output of thread D in the corresponding register file block, the multi-core processor 100 will restart the processing of the next instruction after the first instruction, execution of which resulted in a correctable error.

If selective outputs from only two out of the four threads A, B, C, and D are a match, or none of the selective outputs from the four threads A, B, C, and D are a match, then it is concluded that there is an error in processing by the multi-core processor 100. Further, in this scenario, the error cannot be corrected. In this case, the second data compare engine 120 will generate an interrupt to warn about the error. The interrupt routine may re-execute the failed first instruction ADD R1, R2, R3 again, to see if the error persists. If the error persists, the interrupt routine may re-execute the failed first instruction one or more times, and if the error persists above a threshold of re-execution, it is concluded that there is a fatal fault in the multi-core processor 100 and appropriate fatal fault signal is generated. In some examples, the threshold of re-execution may be just one re-execution. In some examples, the threshold of re-execution may be more than one re-execution, provided such multiple re-execution will not unduly delay the execution of the program itself.

Second instruction ADD R4, R1, R3, the third instruction SUB R3, R4, R1, and the fourth instruction SFTL R3, #3 are all similarly executed in sequence through respective ALU pipe, using thread A, thread B, thread C, and thread D, as described with reference to the first instruction ADD R1, R2, R3. And, selective output of thread A, thread B, thread C, and thread D are compared by the second data compare engine for a match and detect any error in processing by the multi-core processor 100. Further, corrective action is taken if an error is detected, as previously described.

Fifth instruction STO (R3), R4 corresponds to storing the contents of register R4 in memory location stored in register R3. As previously described, as this corresponds to a load-store operation, corresponding load-store pipe 110a and 110b will be used by first processor 102a and second processor 102b respectively. Now, referring back to table 200 of FIG. 2A, referring to cell 220, we notice that execution of fifth instruction STO (R3), R4 by thread A results in an output at the first decoder 136a at the end of cycle No. 9. And, the output at the address translator 146a of the load-store pipe 110a is available at the end of cycle No. 12, for thread A. Similarly, referring to cell 222, we notice that execution of fifth instruction STO (R3), R4 by thread B results in an output at the first decoder 136a at the end of cycle No. 10. And, the output at the address translator 146a of the load-store pipe 110a is available at the end of cycle No. 13, for thread B.

Now, referring to FIG. 2B, referring to cell 270, at the end of cycle No. 11, fifth instruction STO (R3), R4 was processed by first decoder 136b, as part of thread C. And, the output at the address translator 146b of the load-store pipe 110b is available at the end of cycle No. 14, for thread C. Similarly, referring to cell 272, at the end of cycle No. 12, fifth instruction STO (R3), R4 was processed by first decoder 136b, as part of thread D. And, the output at the address translator 146b of the load-store pipe 110b is available at the end of cycle No. 15, for thread D.

In one example, the output of thread A at the end of cycle No. 12, thread B at the end of cycle No. 13, thread C at the end of cycle No. 14 and thread D at the end of cycle No. 15 are selectively compared for a match. For example, the first data compare engine 118 may be selectively configured to perform the comparison of the output of thread A, thread B, thread C, and thread D. FIG. 3B shows an example first data compare engine 118.

Now, referring to FIG. 3B, first data compare engine 118 is described. The first data compare engine is configured to receive the output of address translator 146a from the first processor 102a and the output of address translator 146b from the second processor 102b. As previously described, the thread A, thread B, thread C and thread D are initiated at different cycles, and in this example, in consecutive cycles. The first data compare engine 118 includes a plurality of buffers to hold the output of each thread A, thread B, thread C, and thread D, until all the outputs are available for comparison. In one example, a plurality of buffers are provided for each thread, to store output at various cycles. For example, the first data compare engine 118 may include a thread A LS buffer bank 322, a thread B LS buffer bank 324, thread C LS buffer bank 326, and thread D LS buffer bank 328. The first data compare engine 118 further includes a LS comparator 330, configured to selectively compare the output of thread A, thread B, thread C and thread C. In one example, selective output of thread A LS buffer bank 322 is compared with selective output of thread C LS buffer bank 326, for a match by the LS comparator 330. Further, selective output of thread B LS buffer bank 324 is compared with selective output of thread D LS buffer bank 308, for a match by the LS comparator 330.

In one example, for fifth instruction STO (R3), R4, the output of thread A at cycle No. 12 stored in the thread A LS buffer bank 322 is selectively compared with the output of thread C at cycle No. 14 stored in the thread C LS buffer bank 326 for a match. Similarly, the output of thread B at cycle 13 stored in the thread B LS buffer bank 324 is selectively compared with the out of thread D at cycle No. 15 stored in the thread D LS buffer bank 328 for a match.

In one example, if selective outputs from all of the four threads A, B, C, and D match, then it is concluded that there is no error in processing by the multi-core processor 100. If selective outputs from three out of the four threads A, B, C, and D are a match, then it is concluded that there is an error in processing by the multi-core processor 100. Further, the selective output of the thread that does not match with other three threads is considered as at fault and replaced by one of the outputs of the other three threads. For example, if selective outputs of thread A, thread B, and thread C are same and the selective output of thread D is different, then, it is concluded that there was an error in processing thread D. Further the value of the output of thread D is replaced by one of the values of the output of thread A, thread B, or thread C. In one example, the first compare engine 118 will generate a rewrite signal 166 to the storage write delay block 148b (which corresponds to thread D) to selectively replace the value of the output of thread D, with the value of thread C. The output of the correct value from the storage write delay block 148b is fed to the data memory access block 150b, so that corresponding memory location is updated with correct data. Example implementation of storage write delay block will be later described with reference to FIG. 3C.

In one example, after the data memory access block 150b has replaced the value of the output of thread D in the corresponding memory location, the multi-core processor 100 will restart the processing of the next instruction after the fifth instruction, execution of which resulted in a correctable error.

If selective outputs from only two out of the four threads A, B, C, and D are a match, or none of the selective outputs from the four threads A, B, C, and D are a match, then it is concluded that there is an error in processing by the multi-core processor 100. Further, in this scenario, the error cannot be corrected. In this case, the first data compare engine 118 will generate an interrupt to warn about the error. The interrupt routine may re-execute the failed fifth instruction STO (R3), R4 again, to see if the error persists. If the error persists, the interrupt routine may re-execute the failed first instruction one or more times, and if the error persists above a threshold of re-execution, it is concluded that there is a fatal fault in the multi-core processor 100 and appropriate fatal fault signal is generated. In some examples, the threshold of re-execution may be just one re-execution. In some examples, the threshold of re-execution may be more than one re-execution, provided such multiple re-execution will not unduly delay the execution of the program itself in the range of y to z.

Figure 3C:
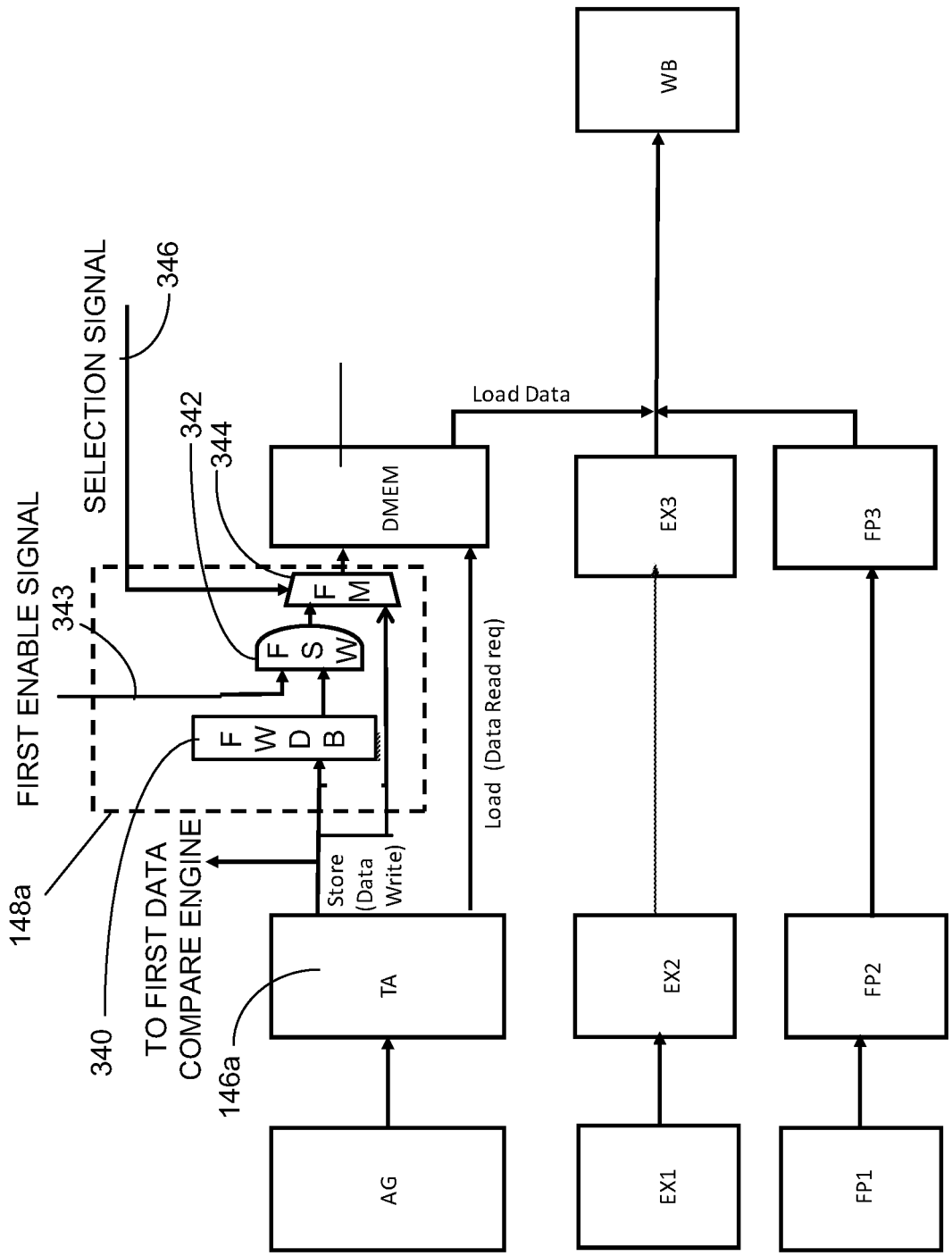
FIG. 3C shows an example storage write delay block of the first processor of the multi-thread processor, according to one aspect of the present disclosure.

Now, referring to FIG. 3C, an example storage write delay block 148a is described. The storage write delay block 148a includes a first WD buffer (FWDB) 340 which is configured to receive the output of both thread A and thread B, from the address translator 146a and hold the output of thread A and thread B by one cycle. The first WD buffer 340 is fed to a first selector switch (FSW) 342, which is selectively enabled by a first enable signal 343 generated by the first data compare engine 118. When the first enable signal 343 is active, the output of the first WD buffer 340 is selectively fed to the data memory access block 150a through a first multiplexer (FM) 344. The first multiplexer 344 is configured to receive the output of the address translator 146a and the output of the first WD buffer 340 and based on a selection signal 346, the first multiplexer 344 will enable either the output of the address translator 146a or the output of the first WD buffer 340. During the processing of fifth instruction STO (R3), R4 by thread A and thread B, the external memory location associated with the first processor 102a will have the result of the thread A (as the output was already written to the memory location pointed by register R3), the first WD buffer 340 will have the result of thread B. In this manner, the memory location associated with first processor 102a pointed by register R3 is not over-written by the output of thread B.

Figure 3D:
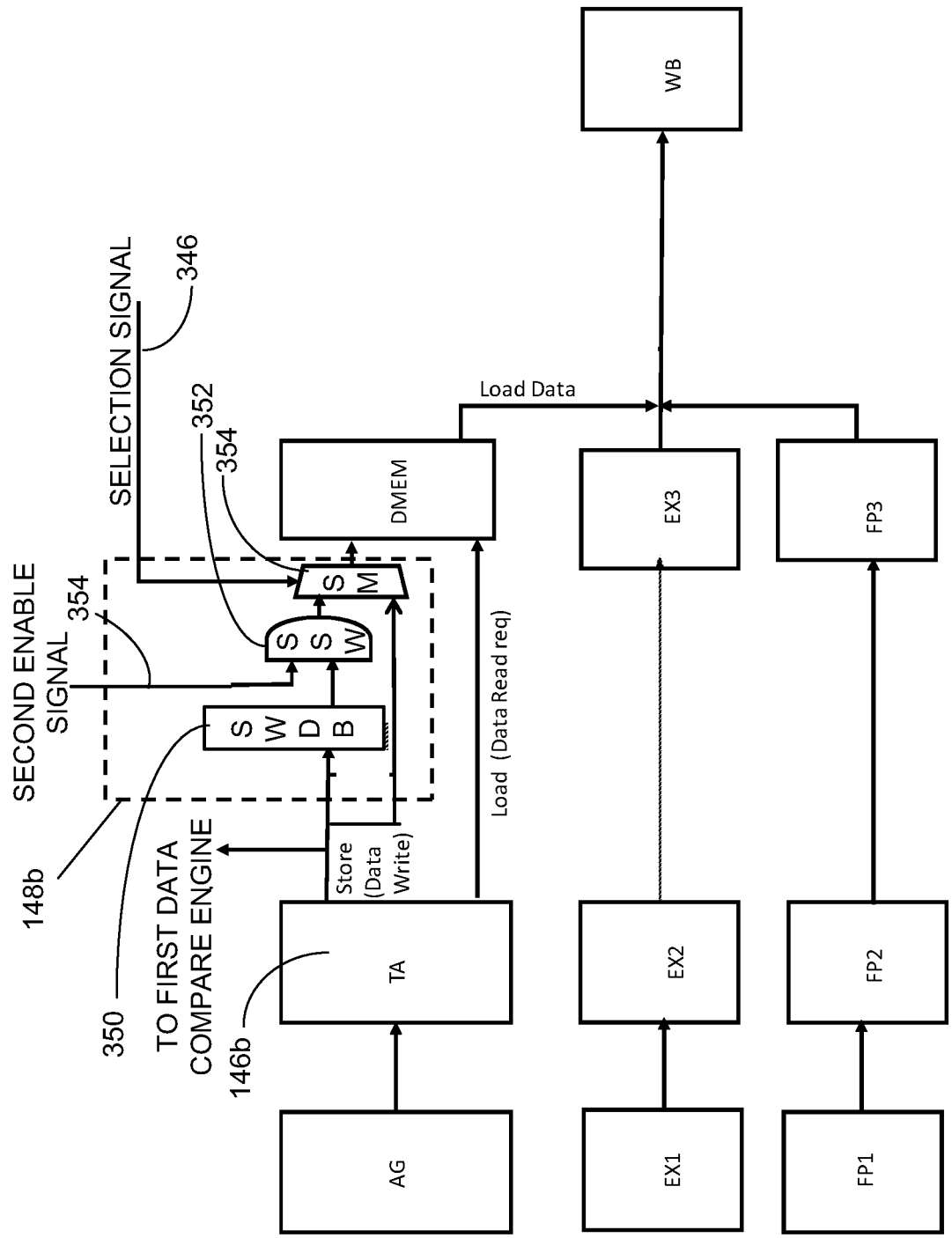
FIG. 3D shows an example storage write delay block of the second processor of the multi-thread processor, according to one aspect of the present disclosure.

Referring to FIG. 3D, an example storage write delay block 148b is described. The storage write delay block 148b includes a second WD buffer (SWDB) 350 which is configured to receive the output of thread D, from the address translator 146b and hold the output of thread D by one cycle. The second WD buffer 350 is fed to a second selector switch (SSW) 352, which is selectively enabled by a second enable signal 354 generated by the first data compare engine 118. When the second enable signal 354 is active, the output of the second WD buffer 350 is selectively fed to the data memory access block 150b through a second multiplexer (SM) 354. The second multiplexer 354 is configured to receive the output of the address translator 146b and the output of the second WD buffer 350 and based on the selection signal 346, the second multiplexer 354 will enable either the output of the address translator 146b or the output of the second WD buffer 340. During the processing of fifth instruction STO (R3), R4 by thread C and thread D, the external memory location associated with the second processor 102a will have the result of the thread C (as the output was already written to the memory location pointed by register R3), the second WD buffer 350 will have the result of thread D. In this manner, the memory location associated with second processor 102b pointed by register R3 is not over-written by the output of thread D.

During the processing of fifth instruction STO (R3), R4, if an error is detected by the first data compare engine 118 and it is correctable, an exception service routine may be initiated, which will selectively re-write the memory location associated with the first processor 102a or the second processor 102b, depending upon which of the output of thread A, thread B, thread C or thread D needs to be corrected. Since thread A and thread B both write to the same memory location associated with first processor 102a and thread C and thread D both write to the same location associated with second processor 102b, the storage write delay block 148a and storage write delay block 148b in conjunction with the first data compare engine permit selective correction of improper data written to the memory location associated with either the first processor 102a or the second processor 102b.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A multi-thread processor, including:
   a first processor configured to execute at least a first thread and a second thread;
   a second processor configured to execute at least a third thread and a fourth thread;
   an instruction execution is initiated in the first thread of the first processor at a first cycle, the execution of the instruction results in a first data to be written to a first storage location;
   the instruction execution is initiated in the second thread of the first processor at a second cycle, the execution of the instruction results in a second data to be written to a second storage location;
   the instruction execution is initiated in the third thread of the second processor at a third cycle, the execution of the instruction results in a third data to be written to a third storage location;
   the instruction execution is initiated in the fourth thread of the second processor at a fourth cycle, the execution of the instruction results in a fourth data to be written to a fourth storage location; and
   at least one data compare engine configured to selectively compare the first data, the second date, the third data and the fourth data to detect an error in execution of the instruction by one or more of the first thread, the second thread, the third thread, and the fourth thread, wherein the first storage location and the second storage location are the same, the third storage location and the fourth storage location are the same and a first storage write delay circuit configured to selectively hold the second data, and a second storage write delay circuit configured to hold the fourth data so as to permit a first data compare engine to selectively compare the first data, the second data, the third data and the fourth data prior to the second data overwriting the first data and the fourth data overwriting the third data.

2. The multi-thread processor of claim 1, wherein, the first cycle, the second cycle, the third cycle, and the fourth cycle are delayed from each other, and the at least one data compare engine includes a plurality of buffers to selectively store the first data, the second data, the third data and the fourth data until all the first data, the second data, the third data and the fourth data are available for comparison.

3. The multi-thread processor of claim 2, wherein, the data compare engine concludes an error was detected, when at least one of the first data, the second date, the third data and the fourth data is different.

4. The multi-thread processor of claim 2, wherein, the at least one data compare engine concludes no error was detected, when all of the first data, the second date, the third data and the fourth data are same.

5. The multi-thread processor of claim 2, wherein, the first cycle, the second cycle, the third cycle, and the fourth cycle are consecutive cycles.

6. The multi-thread processor of claim 2, wherein, when three of the first data, the second date, the third data and the fourth data are a match, one of the first data, the second date, the third data and the fourth data that is not a match is replaced with the matched data.

7. The multi-thread processor of claim 2, wherein, when only two or none of the first data, the second date, the third data and the fourth data are a match, the instruction is re-executed and the first data, the second date, the third data and the fourth data after the rerun is re-executed is compared by the at least one data compare engine for a match.

8. The multi-thread processor of claim 7, wherein, when only two or none of the first data, the second date, the third data and the fourth data are a match, the at least one data compare engine concludes there is a permanent fault and initiates a fault signal.

9. The multi-thread processor of claim 7, wherein, the instruction is re-executed a plurality of times and when only two or none of the first data, the second date, the third data and the fourth data are a match a number of times above a threshold of plurality of re-execution, the at least one data compare engine concludes there is a permanent fault and initiates a fault signal.

* * * * *